May 10, 1949.  T. M. BONDHUS  2,469,543
COUNTER-BORING DEVICE
Filed May 4, 1945

Inventor
Tom M. Bondhus
By Robert M. Dunning
Attorney

Patented May 10, 1949

2,469,543

UNITED STATES PATENT OFFICE 2,469,543

COUNTERBORING DEVICE

Tom M. Bondhus, Monticello, Minn.

Application May 4, 1945, Serial No. 591,913

6 Claims. (Cl. 77—58)

My invention relates to an improvement in counter-boring device wherein it is desired to provide a simple and effective apparatus for producing a counter-bored aperture.

In producing a counter-bored aperture it has been common practice to mount a cutting blade on a suitable shank for the cutting operation. If this cutting tool projects from one side only of the shank considerable side strain is placed thereupon. On the other hand if the tool projects from opposite sides of the shank difficulty is experienced in maintaining the cutting tool centered relative to the shank and with the blade portions thereof at the same angle.

A feature of the present invention resides in the provision of a counter-boring tool which is of the double blade type and which obviates the difficulties previously encountered with tools of this sort. The cutting tool is automatically centered and held in centered position and at the same time both of the cutting blades are maintained at the same angle and in directly opposed relationship.

A feature of the present invention resides in providing a double ended cutter tool having a pair of cutting blade surfaces on opposite ends thereof and in holding the blades at the same angle by means of a sleeve urged against the cutting edges. This sleeve is provided with an end which lies on a plane perpendicular to the axis of the counter-bore shank so that opposite sides of the sleeve will bear against the opposite ends of the cutting tool. As the cutting surface is angularly inclined and is generally cylindrical in shape this tool will rotate in its aperture extending through the axis of the shank until both of the cutter blade surfaces are at the same angle.

A further feature of the present invention resides in cutting the cutter blade surfaces to provide shoulders engageable with the inner surface of the sleeve. By use of this construction, the cutter blade is held from longitudinal movement when mounted in place, thereby holding the blade properly centered relative to the shank.

A further feature of the present invention resides in the provision of a shank having a transverse opening therethrough and in providing opposed notches in the sides of the shank into which may extend projections on the end of the sleeve holding the center bar in place. These projections prevent the sleeve from rotating relative to the shank.

A further feature of the present invention resides in providing a cutter bar shank having a threaded reduced diameter portion at one end thereof and having opposed notches adjacent this reduced diameter portion. A sleeve encircles the reduced diameter portion of the shank and projects on this sleeve extending in the opposed notches to hold the sleeve from rotation. A nut or threaded collar holds the sleeve in place. As a result the cutter blade securing means is of no greater diameter than the body of the shank.

A further feature of the present invention resides in providing a shank with a reduced diameter threaded end portion and notches in the sides of the shank adjacent this reduced diameter portion; and in further providing an aperture through the shank having its axis at an acute angle to the bases of the notches. The notches specified are provided with parallel bases and the aperture through the shank extends at an acute angle to these parallel bases.

These and other objects and novel features of my invention will be more clearly and fully set forth in the following specification and claims.

In the drawings forming a part of my specification:

Figure 2 is an elevational view partly in section showing the construction of my counter-boring tool.

The boring tool A comprises a cylindrical shank 10 having a reduced diameter shank portion 11 concentric therewith at one end thereof. The reduced diameter portion 11 is threaded as indicated at 12. A shoulder 13 is thus produced between the two different diameter portions 10 and 11 of the tool.

Figure 3:
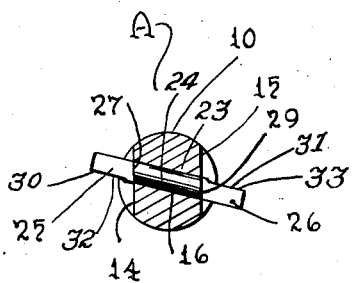
Figure 3 is a sectional view transversely through the shank at the axis of the cutter blade showing the cutter blade in full lines.

As best illustrated in Figure 3 of the drawings opposed notches 14 and 15 are provided in the large diameter portion 10 adjacent the small diameter portion 11. The notches 14 and 15 are spaced apart a distance substantially equal to the diameter of the small diameter portion 11, and the bases of the notches 14 and 15 are parallel.

A cylindrical aperture 16 is provided through the shank 10 communicating with the notches 14 and 15. As again best illustrated in Figure 3 of the drawings the axis of the aperture 16 is at an acute angle to the parallel bases of the notches 14 and 15. In other words, the cutting tool does not extend through the shank with its axis at right angles to the parallel bases of the notches 14 and 15.

A sleeve 17 fits over the shank 11, being of an external diameter substantially equal to that of the shank 10 and having an internal diameter to snugly fit the shank portion 11. Projecting ears 19 and 20 are provided on the sleeve 17 and are formed by cutting away the lower portion of the sleeve 17 to produce the projections 19 and 20 having parallel inner faces. The inner faces of the projections 19 and 20 are spaced apart a distance just sufficient to enclose the parallel faces of the notches 14 and 15. In other words, in the absence of a cutter blade in the aperture 16, the projections 19 and 20 may enclose the notches 14 and 15 until the body of the sleeve 17 engages the shoulder 13 on the shank.

An internally threaded nut or collar 21 is designed to engage the threads 12 of the shank portion 11 so as to clamp the sleeve 17 in position. The collar 21 may be grooved as indicated at 22 for rotation by a screw driver or similar tool. The collar 21 is preferably of sufficient length to extend slightly beyond the threaded end of the shank portion 11 when the tool is in use.

Figure 1:
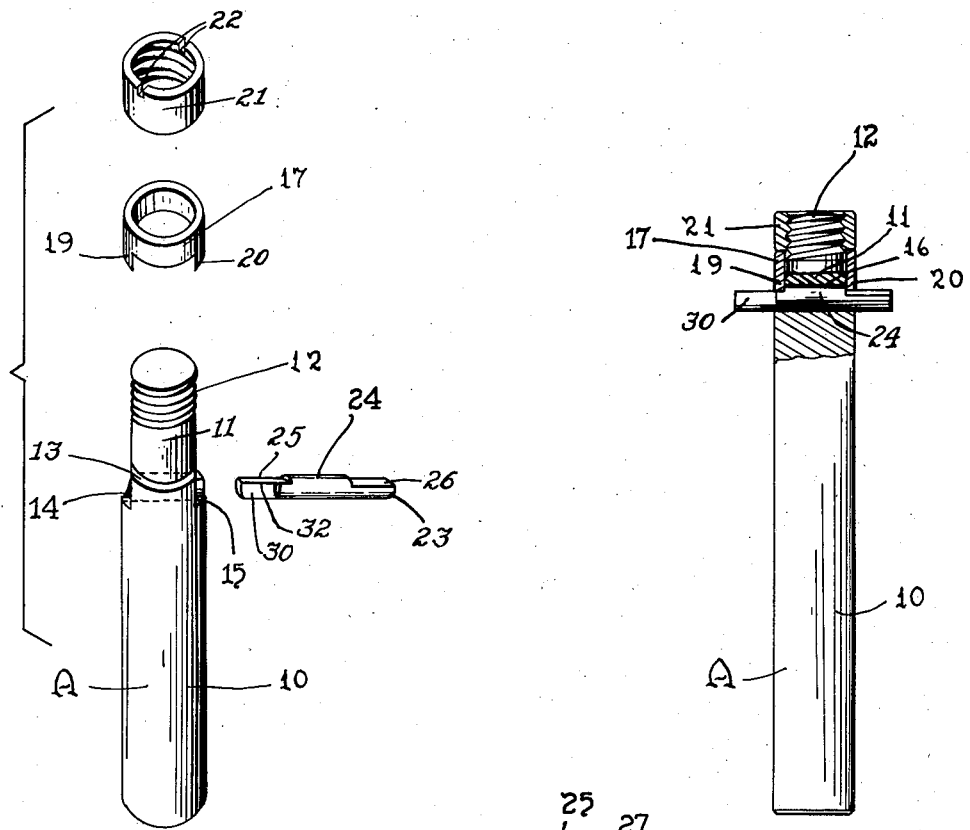
Figure 1 is a perspective view of my counter-bore tool in exploded form.
Figure 4:
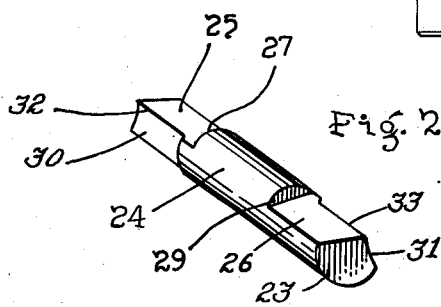
Figure 4 is an end view of the cutter blade.

The cutting tool is best illustrated in the exploded view of Figure 1. This cutting tool 23 is provided with a cylindrical central portion 24 and the upper surface of this tool or bar is cut away at 25 and 26 at an angle corresponding to the angle between the cutter bar axis and the bases of the notches 14 and 15. As indicated in Figure 3 of the drawings the surfaces 25 and 26 are cut in such a manner that the cylindrical portion 24 is of the same length and shape as the aperture 16, the cutting of the cutter bar providing shoulders 27 and 29 designed to hold the cutter bar or blade from longitudinal movement. Each end of the blade is also cut along a plane generally parallel to the axis of the shank 10, these plane surfaces being indicated by the numerals 30 and 31.

The surfaces 25 and 26 are upwardly inclined, the angle of one end of the blade being opposite to the angle of the other end thereof. The high edge 32 of one end of the blade occurs at the juncture of the plane surfaces 25 and 30 while the high edge 33 of the other end of the blade occurs at the juncture between the plane surfaces 26 and 31.

In operation the blade 23 is inserted into the aperture 16 so that the ends of the blade project an equal amount, at which time the shoulders 27 and 29 are flush with the bases of the notches 14 and 15 respectively. At the time the sleeve 17 is applied to the shank 11, the projections 19 and 20 enclosing the portion of the notches 14 and 15 most closely adjacent the reduced diameter shank portion 11. The projections 19 and 20 are of equal length and the undersurface of these projections in on a plane perpendicular to the axis of the sleeve. As a result the projections 19 and 20 engage against the cutter blade 23 on each side of the center of the blade.

If the high edge 32 on one end of the cutter blade is above the level of the high edge 33 thereof, the projection 19 will engage the blade surface 25 before the projection 20 engages the surface 26. As a result the cutter bar 23 will be rotated about its axis until the high edges 32 and 33 of the two blade ends are at the same axial distance from the butt end of the shank 10. Similarly if the blade 23 is rotated so that the high edge 33 is above the level of the edge 32 the projection 20 will engage in the plane surface 26 of the blade and will rotate the same about its axis until the edges 32 and 33 are at the same elevation or at the same axial distance from the butt end of the shank 10.

It will be noted that when the sleeve 17 is in place this sleeve is held from rotation by engagement of the projections 19 and 20 with the notches 14 and 15. Furthermore the projections 19 and 20 engage outwardly of the shoulders 27 and 29 on the blade 23 thus holding the blade from longitudinal movement. As a result when the nut or collar 21 is in place the cutter blade 23 is in proper relation with both its cutting edges 32 and 33 at the same distance from the end of the tool and the blade is held from angular or longitudinal movement.

In accordance with the patent statutes, I have described the principles of construction and operation of my counter-boring device, and while I have endeavored to set forth the best embodiment thereof, I desire to have it understood that obvious changes may be made within the scope of the following claims without departing from the spirit of my invention.

I claim:

1. A counter-boring tool comprising a shank, a pair of opposed notches in opposite sides of said shank, a sleeve engageable about said shank and including projection means engageable into said opposed notches, an aperture through said shank between said notches and communicating therewith, a cutter blade in said aperture and projecting at opposite sides of the shank, said projection means engaging said cutter blade on opposite sides of said shank.

2. A counter-boring tool comprising a shank, a reduced diameter portion on said shank, a pair of opposed notches in said shank adjacent said reduced diameter portion, an aperture extending through said shank communicating with said notches, a cutting tool in said aperture projecting from opposite sides of said shank, a collar encircling said reduced diameter portion and including projections engageable with opposite sides of said cutting tool and means for holding said collar in place.

3. A counter-boring tool comprising a shank, a pair of notches in opposite sides of said shank, an aperture extending transversely through said shank connecting said notches, a cutter blade extending through said aperture and projecting from opposite sides of said shank, said cutter blade including an intermediate portion and opposed cutting blade surfaces on the opposite ends thereof, shoulders between said intermediate portion and said cutting blade surfaces, and means engaging said shoulders to hold said blade from longitudinal movement.

4. A counter-boring tool comprising a shank, a pair of opposed notches in said shank, an aperture through said shank connecting said opposed notches, a cutter blade extending through said aperture, cutting blade surfaces on opposite ends of said blade, shoulders between said cutting blade surfaces and the remainder of said cutting blade, a sleeve encircling said shank and including projection means extending into said notches and engageable outwardly of said shoulders to hold said cutting blade from longitudinal movement.

5. A counter-boring tool comprising an elongated shank, a reduced diameter end portion thereupon, opposed notches in said shank adjacent said reduced end portion, a sleeve encircling said reduced end portion, an aperture through said shank connecting said opposed notches, a sleeve encircling said reduced end portion and including projections engageable in said opposed notches, a cutter blade extending through said aperture, opposed cutting blade surfaces on opposite ends of said cutter blade, shoulders between said cutting blade surfaces and the remainder of said cutter blade, said shoulders engaging inwardly of said projections to hold said cutter blade from longitudinal movement.

6. A counter-boring tool comprising a shank, a reduced diameter end thereupon, opposed notches in said shank adjacent said reduced diameter end, an aperture through said shank communicating with said notches, a sleeve engageable about the reduced diameter portion of said shank, a blade supported in said aperture projecting from opposite sides of said shank, opposed cutting edges on opposite ends of said blade, projections on said sleeve engageable in said notches and against said opposed cutting edges, and means for holding said collar means on said reduced diameter portion of said shank.

TOM M. BONDHUS.

REFERENCES CITED

The following references are of record in the file of this patent:

UNITED STATES PATENTS

| Number | Name | Date |
|---|---|---|
| 293,397 | Baker | Feb. 12, 1884 |
| 319,852 | Riddell et al. | June 9, 1885 |
| 676,669 | Wack | June 18, 1901 |
| 1,162,163 | Hickey | Nov. 30, 1915 |
| 1,336,466 | Lamb | Apr. 13, 1920 |
| 2,359,474 | Gairing | Oct. 3, 1944 |
| 2,374,761 | Lusa | May 1, 1945 |